US010059308B2

(12) United States Patent
Caillot et al.

(10) Patent No.: US 10,059,308 B2
(45) Date of Patent: Aug. 28, 2018

(54) ACCESSORY AND WIPER OF MOTOR VEHICLE

(71) Applicant: Valeo Systèmes d'Essuyage, Le Mesnil-St-Denis (FR)

(72) Inventors: Gérald Caillot, Cernay la Ville (FR); Philippe Carraro, St-Amant-Tallende (FR); Clémentine Derrepas, Le Mesnil Saint Denis (FR); Frédéric Giraud, Le Perray en Yvelines (FR); Giuseppe Grasso, Le Breuil sur Couze (FR); Jean-Michel Jarasson, Le Mesnil-St-Denis (FR); Michael Schaeuble, Vaihingen/Enz (DE); Pierre Sevellec, Cournon (FR); Denis Thebault, Clermont Ferrand (FR); Marcel Trebouet, Chavenay (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 291 days.

(21) Appl. No.: 14/266,084

(22) Filed: Apr. 30, 2014

(65) Prior Publication Data

US 2014/0317871 A1    Oct. 30, 2014

(30) Foreign Application Priority Data

Apr. 30, 2013   (EP) .................................... 13305571

(51) Int. Cl.
*B60S 1/38*    (2006.01)
*B60S 1/52*    (2006.01)
*B60S 1/48*    (2006.01)

(52) U.S. Cl.
CPC ............ *B60S 1/3805* (2013.01); *B60S 1/381* (2013.01); *B60S 1/488* (2013.01); *B60S 1/3862* (2013.01); *B60S 1/524* (2013.01)

(58) Field of Classification Search
CPC .... B60S 1/3803; B60S 1/3805; B60S 1/3806; B60S 1/381; B60S 1/488; B60S 1/522;
(Continued)

(56) References Cited

U.S. PATENT DOCUMENTS 1,811,717 A * 6/1931 Ellixson ................ B60S 1/3805
                                                    15/250.09
2,627,011 A * 1/1953 Eaves ................... B60S 1/3805
                                                    15/250.07
(Continued)

FOREIGN PATENT DOCUMENTS

DE    3740639 A1 *  6/1989
DE    4118926 A1 * 12/1992
(Continued)

OTHER PUBLICATIONS

Machine translation of description portion of German publication 102010029841, published Dec. 15, 2011.*

*Primary Examiner* — Gary Graham
(74) *Attorney, Agent, or Firm* — Osha Liang LLP

(57) ABSTRACT

The invention relates to an accessory for wiper of motor vehicle comprising at least one heating channel (16; 16*a*, 16*b*) for receiving a heating element of the wiper, characterized in that said accessory (6; 10; 26) is made of a first part (17; 27) movable with respect to a second part (18; 28) in order to open said at least one heating channel (16; 16*a*, 16*b*) longitudinally.

Figure 1:
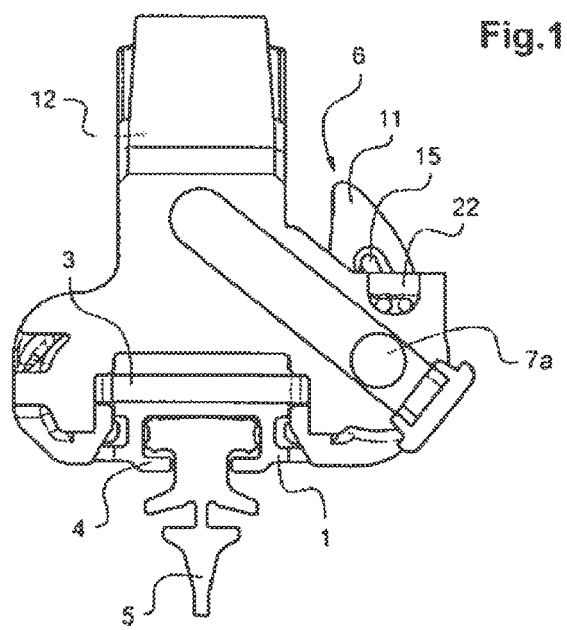

This invention also relates to a wiper of motor vehicle comprising such accessory.

18 Claims, 6 Drawing Sheets

(58) Field of Classification Search
CPC ......... B60S 1/524; F16L 11/12; F16L 11/121; F16L 53/008
USPC .......................... 15/250.04, 250.201, 250.07
See application file for complete search history.

(56) References Cited

U.S. PATENT DOCUMENTS 5,661,871 A * 9/1997 Scorsiroli ............. B60S 1/3801
15/250.451
6,513,185 B1 * 2/2003 Zimmer ................. B60S 1/522
15/250.01

FOREIGN PATENT DOCUMENTS

| | | | |
|---|---|---|---|
| DE | 102010029841 A1 * | 12/2011 | |
| WO | WO2011/066268 A1 * | 6/2011 | |
| WO | WO2011/143108 A1 * | 11/2011 | |
| WO | WO2012/089552 A1 * | 7/2012 | |

* cited by examiner

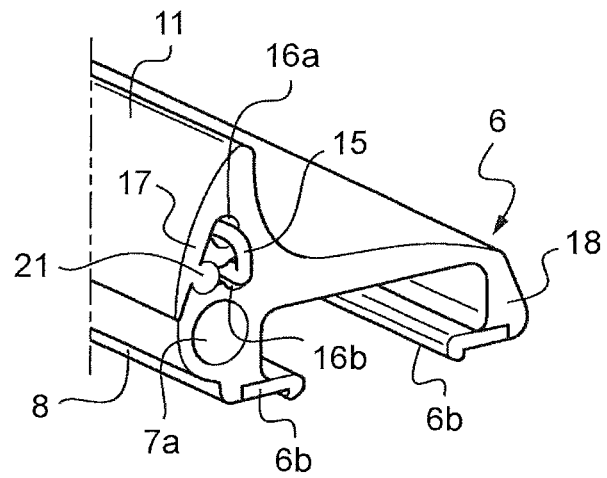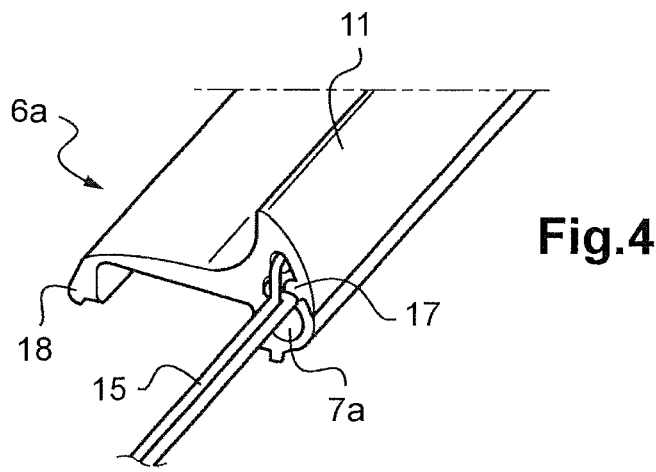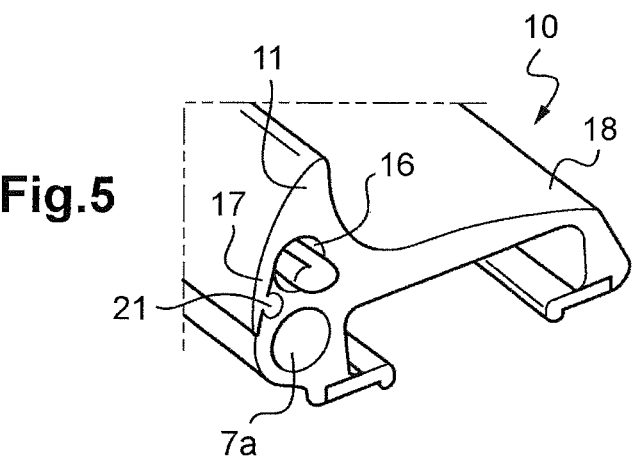

ACCESSORY AND WIPER OF MOTOR VEHICLE

The present invention relates to a wiper of motor vehicle. The invention also relates to an accessory for said wiper.

Some wipers for motor vehicle, known as "flexible blade" or "flat blade", comprise a central member comprising a longitudinal substrate or "holder" made of a semi-rigid material, a metal rod accommodated in a longitudinal cavity of the substrate, a wiping blade and an accessory.

This metallic rod or "spline" has a double function of providing, on the one hand, to the whole wiper the stiffness required for a correct mechanical behavior, as well as the distribution of pressure exerted by the driving arm on the windscreen.

The wiping blade made of elastomer is fixed to the longitudinal substrate through a claw extruded with the substrate.

The accessory is intended to improve the quality of the wiping. It is generally made of elastomer and is assembled with the longitudinal substrate through various means.

The accessory may comprise an aerodynamic deflector which uses the relative wind flowing on the vehicle to increase the pressure of the wiper against the window to be wiped.

In some wipers, known as "aquablade" wipers, the accessory comprises at least one fluid channel arranged laterally along the longitudinal substrate, provided with holes enabling the spraying of the washing liquid onto the windscreen. In a one-channel version, the accessory comprises only one fluid channel whereas in a bi-channel version, it includes two fluid channels arranged on each side of the longitudinal substrate.

Some wipers also comprise heating means to heat the wiper under negative outside temperature conditions.

For example for aquablade wipers, the washing liquid contained in the fluid channel may freeze due to the absence of anti-freeze product in the liquid. The freezing of the washing liquid in the fluid channel may disable the spraying function of the wiper and increase the stiffness of the whole structure of the wiper which is particularly penalizing within the scope of the "flexible blade" technology.

A known solution is to heat wipers by means of a heating resistive element arranged in the accessory which is advantageously a heating wire. The heating wire is for example housed inside a longitudinal channel located in the aerodynamic deflector or is co-extruded with the accessory. However, once introduced, it is difficult to access to the heating wire.

One aim of the invention is to provide an improved wiper of motor vehicle of the flexible blade type comprising heating means to heat the wiper in case of freezing.

This object is achieved by an accessory for wiper of motor vehicle comprising at least one heating channel for receiving a heating element of the wiper, characterized in that said accessory is made of a first part movable with respect to, a second part, in order to open said at least one heating channel longitudinally.

Therefore, the wiper can be heated by a heating wire. The heating wire is well integrated in the accessory and the assembling process of the heating wire is easy. Moreover, the accessory may easily be reopen, to remove or change the heating wire in case of failure.

According to an embodiment, the first part and the second part are made in one piece of deformable material. They are for example made of plastic, allowing the deformation of the longitudinal link between the first part and the second part enabling the opening.

According to another embodiment, the first part and the second part are two distinct parts.

The at least one heating channel may be mainly arranged in the second part which comprises fixation means to fix the accessory to a longitudinal substrate of the wiper.

The fixation means can also be glue, welding or other means for adhering.

The accessory may comprise locking means to lock the closing of the first part with the second part.

The locking means, the first and second parts may be formed in one piece.

The locking means may comprise snap means.

The snap means may comprise at least one locking channel and a respective complementary locking rib. The locking channel may be arranged in the second part which comprises fixation means to fix the accessory to a longitudinal substrate of the wiper and the respective complementary locking rib may be arranged in the first part. Therefore, when, the moveable first part is pressed against the second part, the locking channel is introduced and blocked into the complementary locking rib, by elastic deformation.

The snap means may comprise a plurality of locking channels and a plurality of respective complementary locking ribs.

The at least one locking channel may communicate with the at least one heating channel.

For example, the locking channel and the respective complementary locking rib have cylindrical complementary shapes. In another example, the locking channel and the respective complementary locking rib have prismatic complementary shapes. These specific shapes of the snap means allow avoiding unintended openings.

The accessory may comprise two heating channels and the opening of the first part gives access to both heating channels.

The accessory may comprise at least one fluid channel provided with holes enabling the spraying of a washing liquid. Therefore, the washing liquid flowing through the fluid channel which might be frozen under negative outside temperature conditions can be heated by the heating wire. It is thus possible to restore or maintain the spraying function and the flexibility of the wiper that could have been restrained by the frozen liquid.

The invention has also for object a wiper of motor vehicle, comprising:
a longitudinal substrate,
a spline received in said longitudinal substrate,
a wiping blade fixed to said longitudinal substrate,
characterized in that it comprises at least one accessory such as previously described, and a heating wire received in the heating channel of the accessory.

The accessory may comprise at least one fluid channel arranged along the longitudinal substrate, provided with holes enabling the spraying of the washing liquid.

The wiper may comprise an electrical connector and two accessories, the heating wire passing through the at least one heating channel of both accessories, and the electrical connector connecting both ends of the heating wire.

The wiper may comprise a washing liquid connector and two accessories, having fluid channels connected by said washing liquid connector.

The wiper may further comprise a cover to maintain the heating wire against the washing liquid connector so that it can also be heated by the same heating wire.

According to another embodiment, the washing liquid connector may comprise a longitudinal guide to receive the heating wire, to guide the two ends of the heating wire so that they can be kept in the right position to be plug to the wiper arm.

In one embodiment a single heating channel is arranged in the accessory, the heating wire passing twice through said heating channel, making a U-turn at one end of the accessory.

In another embodiment, two heating channels are arranged in the accessory, the heating wire passing through the first and second heating channel, making a U-turn at one end of the accessory. Therefore, if the accessory comprises two fluid channels, one heating channel can be arranged close to a respective fluid channel so that the washing liquid flowing through each fluid channel which might be frozen under negative outside temperature conditions, can be heated by a respective heating wire.

Other objects, features and advantages of the invention will become apparent from the following description of a non-limited example and enclosed drawings.

Figure 2A:
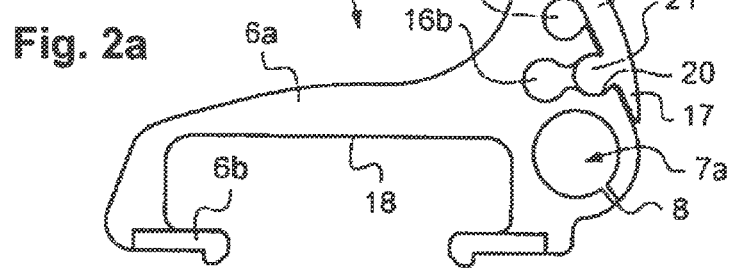
Figure 2B:
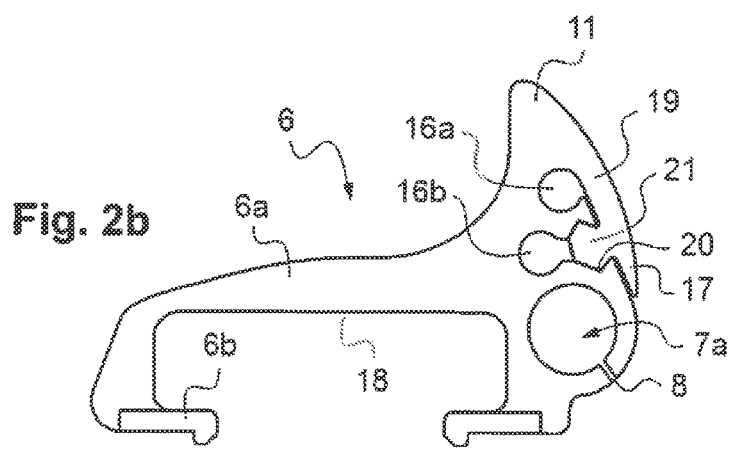
Figure 6:
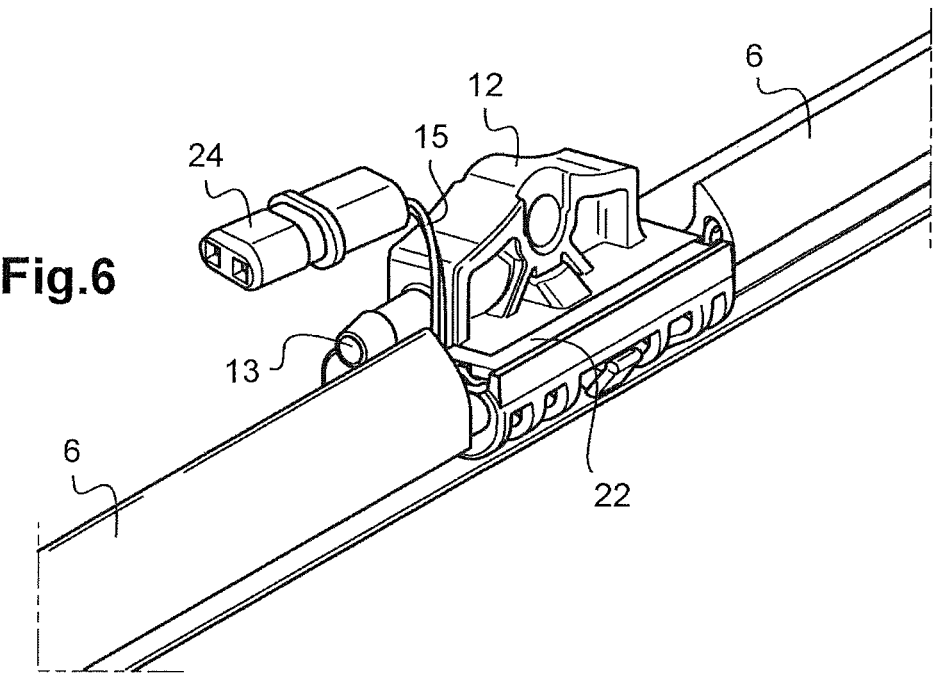
Figure 7:
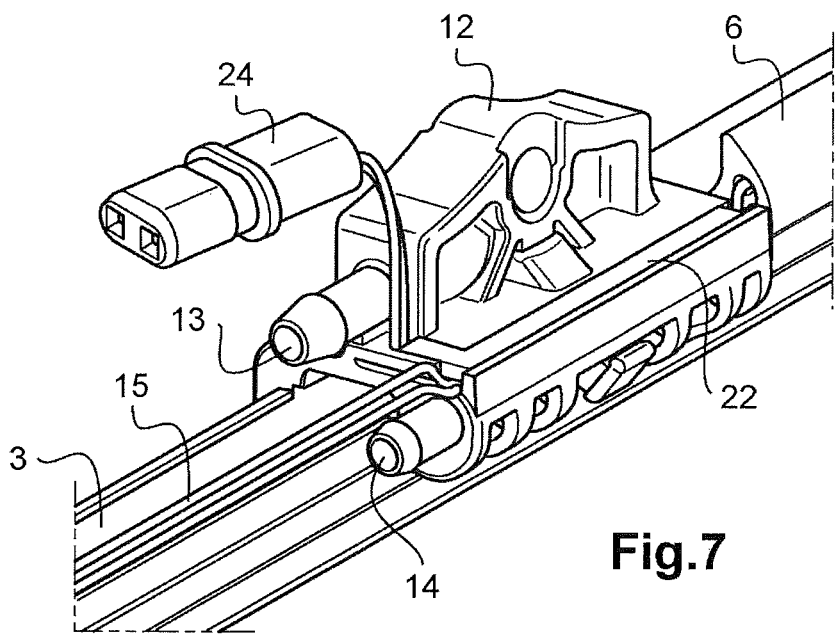
Figure 8:
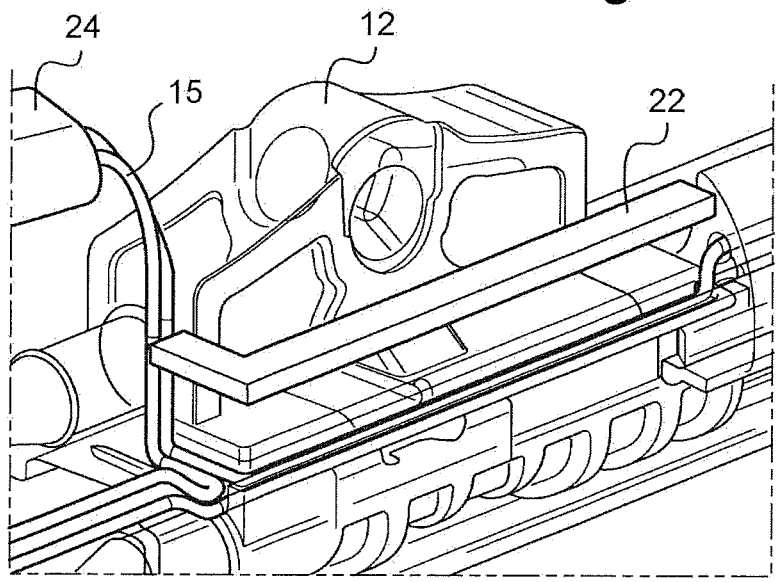
Figure 9:
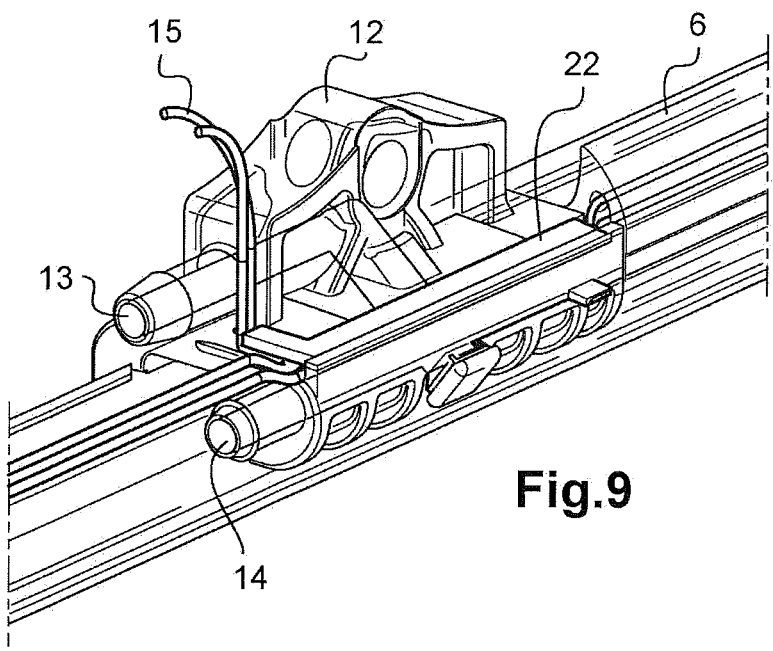
Figure 10:
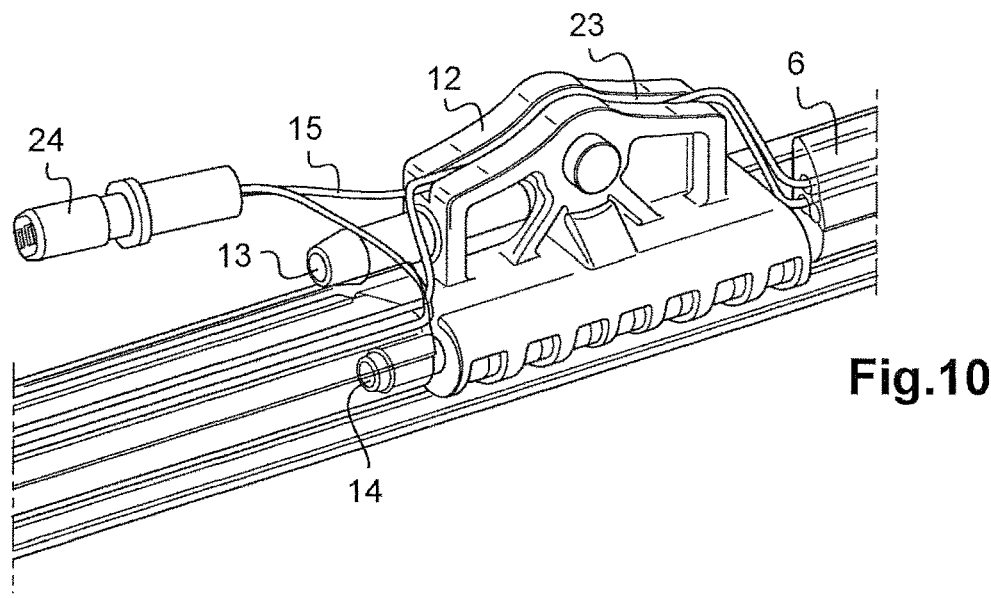
Figure 11:
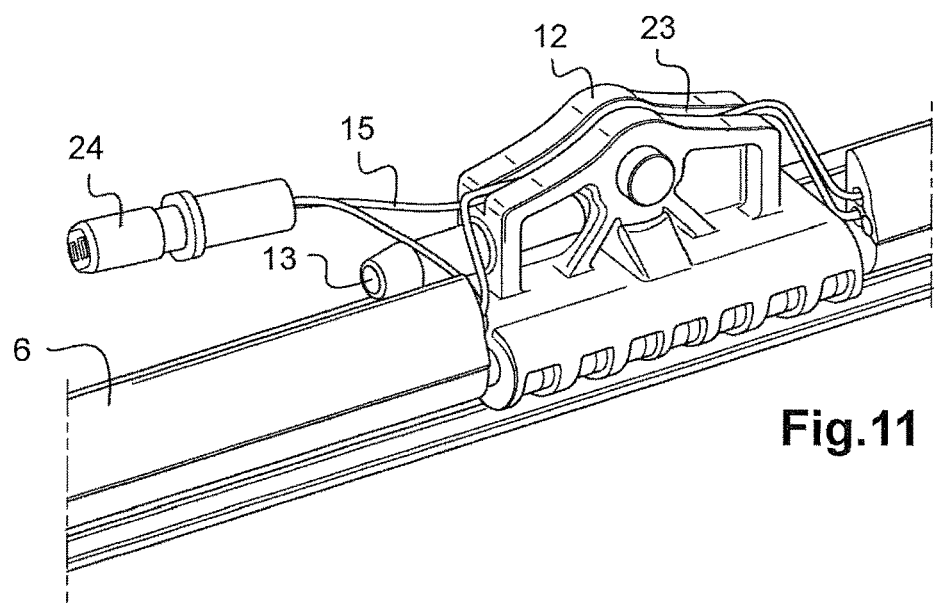
Figure 12:
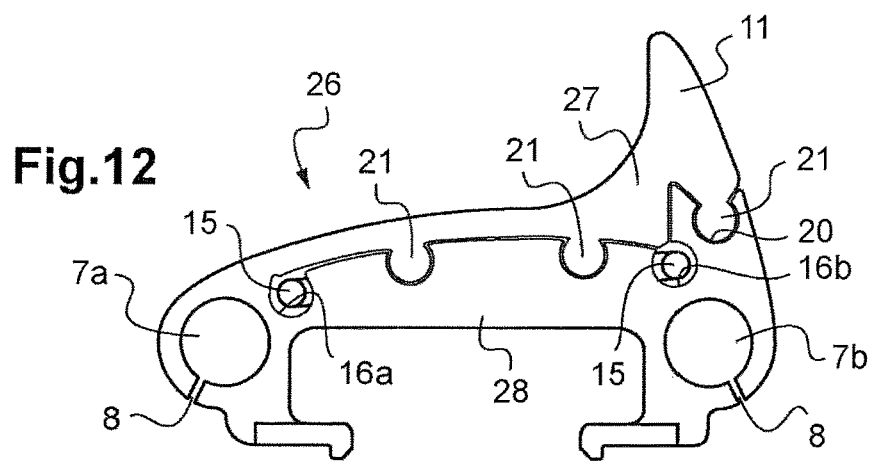
Figure 13:
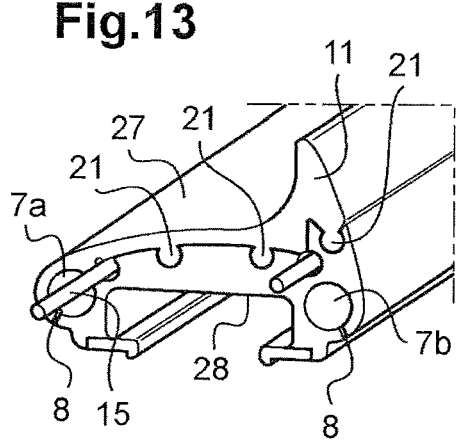
Figure 14:
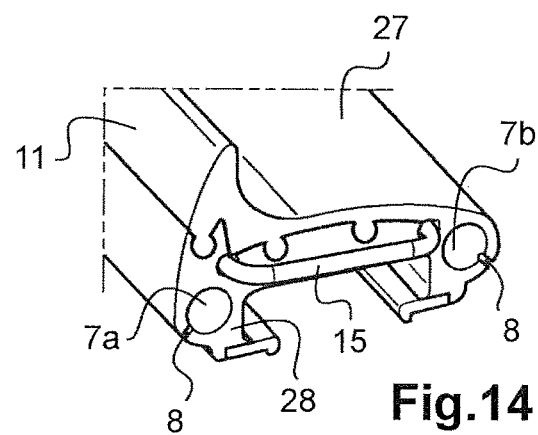
Figure 15:
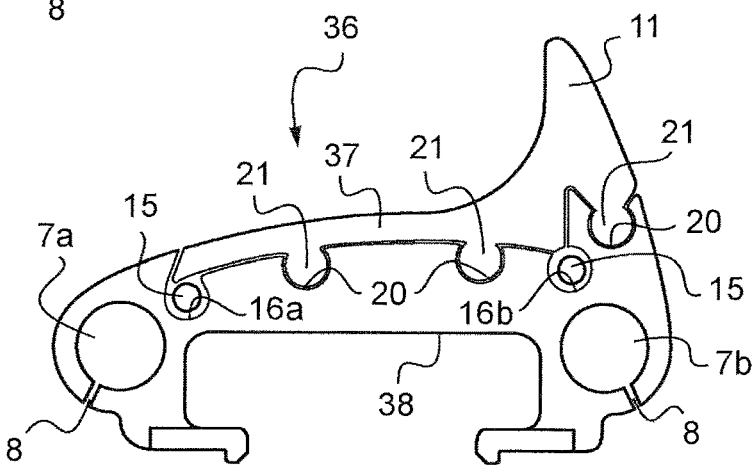
Figure 16:
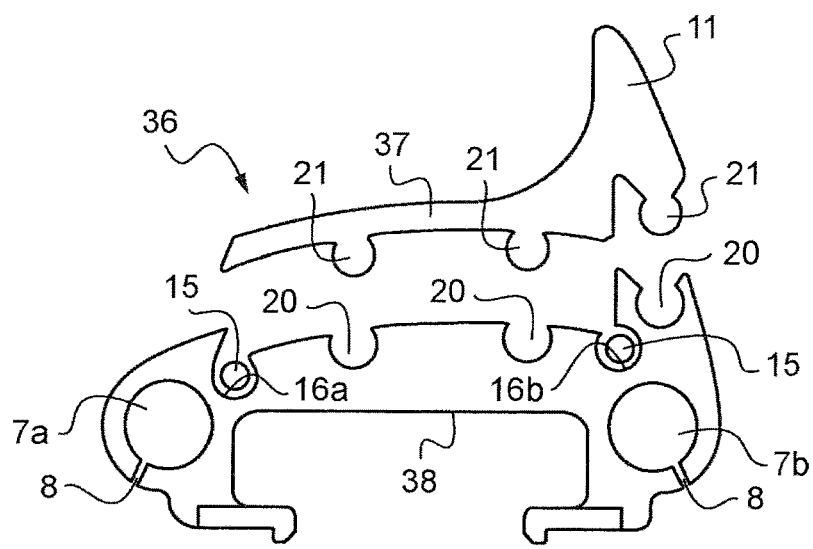

For a better understanding of the invention with regard to the embodiments thereof, reference is made to the accompanying drawings, in which like numerals designate corresponding elements or sections throughout, and in which:

FIG. 1 shows a cross-section of a wiper of motor vehicle for an aquablade wiper of one-channel version, FIG. 2a shows a cross-section of an accessory of a wiper of motor vehicle for a one-channel version, having two heating channels, according to an embodiment, FIG. 2b shows a cross-section of an accessory of a wiper of motor vehicle for a one-channel version, having two heating channels, according to an embodiment, FIG. 3 shows a perspective view of a first end of the accessory of the wiper of FIG. 2a, with a heating wire housed in the heating channels, FIG. 4 shows a perspective view of the second end of the accessory of FIG. 3, FIG. 5 shows a perspective view of a first end of an accessory of a wiper according to a second embodiment, with a heating wire housed in a single heating channel, FIG. 6 shows a partial perspective view of the wiper of FIG. 1, FIG. 7 shows the partial perspective view of the wiper of FIG. 6 with an accessory removed for a better comprehension, FIG. 8 shows the partial perspective view of FIG. 6, wherein some elements have been represented by transparency and wherein the cover is disassembled, FIG. 9 shows a similar view of FIG. 7 with elements represented by transparency, FIG. 10 shows a partial perspective view of a wiper according to a third embodiment, with the accessories represented by transparency, FIG. 11 shows the same view as FIG. 10 without the accessories represented by transparency, FIG. 12 shows a cross-section of an accessory of an embodiment of a wiper of motor vehicle for a bi-channel version, FIG. 13 shows a perspective view of a first end of the accessory of the wiper of FIG. 12, with a heating wire housed in the heating channels, FIG. 14 shows a perspective view of the second end of the accessory of FIG. 12, FIG. 15 shows a cross-section of another embodiment of an accessory of a wiper of motor vehicle for a bi-channel version, and FIG. 16 shows the accessory of FIG. 15 in a disassembled state.

FIGS. 1 to 16 show some elements of a wiper of motor vehicle, known as "flexible blade" or "flat blade".

The wiper includes a longitudinal substrate 1 made of a semi-rigid material, such as an extruded plastic material.

Such substrate 1 includes a longitudinal guide intended to receive a metallic stiffening rod 3 or "spline" which extends substantially on the whole length of the wiper (FIG. 1). The spline 3 has a double function of providing, on the one hand, to the whole wiper the stiffness required for a correct mechanical behavior, as well as the distribution of pressure exerted by the driving arm on the windscreen.

The substrate 1 also includes wiping blade fixation means, to maintain the wiping blade 5 of the wiper. The wiping blade fixation means comprise for example longitudinal claws 4, for example extruded with the body substrate, wherein a wiping blade 5 made of elastomer is introduced.

The wiper further comprises an accessory 6, for example made of plastic, and obtained for example by extrusion independently of the substrate 1. The accessory 6 is intended to improve the quality of the wiping.

In one embodiment, the accessory 6 may comprise an aerodynamic deflector 11 intended to improve the contact and the pressure of the wiping blade 5 against the window of the vehicle.

The accessory 6 is generally composed of one or two materials. For example as represented in FIGS. 2a and 2b, the accessory 6 comprises two kinds of plastics 6a, 6b, co-extruded. The second material 6b is shaped with longitudinal tongs (FIG. 1) or longitudinal hooks (FIGS. 2a and 2b) which cooperate with the longitudinal substrate 1 to fix the longitudinal substrate 1 and the accessory 6 together. For example, the second material 6b is made with a plastic less hard than the first material 6a in order to cooperate with the longitudinal substrate 1. It should be noted that the accessory 6 may also be assembled with the longitudinal substrate 1 through other various means.

The wiper also includes at least one heating wire 15 for heating the wiper. The heating wire 15 is a resistive wire powered electrically.

At least one heating channel 16a, 16b is made in the accessory 6 to receive the heating wire 15. Therefore, the wiper can be heated by a heating wire 15.

The accessory 6 is made of a first part 17 movable with respect to a second part 18 in order to open the at least one heating channel 16a, 16b longitudinally.

In embodiments represented in FIGS. 2a and 2b, the first part 17 and the second part 18 are made in one piece of deformable material. They are for example made of plastic, allowing the deformation of the longitudinal link 19 between the first part 17 and the second part 18.

Thus, the heating wire 15 is well integrated, in the accessory 6 and the assembling process of the heating wire 15 in the accessory 6 is easy. Moreover, the accessory 6 may easily be reopen, to remove or change the heating wire 15 for example in case of failure.

In the example represented in FIGS. 2a to 4, the accessory 6 comprises two heating channels 16a, 16b. The heating wire 15 passes successively through the first and second heating channels 16a, 16b, making a U-turn at one end of the accessory 6, outside the accessory 6.

Both heating channels 16a, 16b are for example mainly arranged in the second part 18 which comprises fixation means to the longitudinal substrate 1 of the wiper. For example, the opening of the first part 17 gives access to both heating channels 16a, 16b.

In another embodiment represented on FIG. 5, a single heating channel 16 is arranged in the accessory 10. In this example, the heating wire 15 passes twice through the same heating channel 16, making a U-turn at one accessory 10 end, outside the accessory 10.

The accessory 6; 10 may also comprise locking means to lock the closing of the first part 17 with the second part 18.

For example, the locking means comprise snap means allowing locking the closing by an elastic deformation.

For example, the snap means comprise a locking channel 20 and a respective complementary locking rib 21, both extending longitudinally. The locking channel 20 is for example arranged in the second part 18 and the respective complementary locking rib 21 is arranged in the first part 17. When the moveable first part 17 is pressed against the second part 18, the locking channel 20 is introduced and blocked into the complementary locking rib 21, by elastic deformation.

The locking channel 20 and the respective complementary locking rib 21 have for example cylindrical complementary shapes (FIG. 2a). However, the locking channel and the respective complementary locking rib may have other complementary shapes, such as prismatic complementary shapes (FIG. 2b). These specific shapes of the snap means avoid unintended openings.

The locking channel 20 may communicate with at least one heating channel 16b such as represented in FIGS. 2a and 2b.

The locking means, the first and second parts 17, 18 are formed in one piece. There are all located for example in the aerodynamic deflector 11 of the accessory 6.

The accessory 6, 10 of some wipers, known as «aquablade», such as represented on FIGS. 1 to 13, further comprises at least one fluid channel 7a arranged along the longitudinal substrate 1. This fluid channel 7a is perforated with, holes 8 so as to enable a spraying of a washing liquid onto the windscreen.

FIGS. 1 to 9 illustrate one-channel version wherein the accessory 6, 10 includes a single fluid channel 7a. In a bi-channel version, the accessory 26, 36 comprises two fluid channels 7a, 7b arranged on each side of the longitudinal substrate 1 (FIGS. 12 to 16).

More precisely as it can be seen on FIG. 6, the wiper comprises two accessories 6 arranged on each side of a washing liquid connector 12.

The washing liquid connector 12 is for example made of plastic material. It comprises fixation means to the wiper arm and is provided with at least one washing liquid inlet 13 and at least one washing liquid outlet 14. The washing liquid inlet 13 is configured to be connected to a hydraulic line (not shown) bringing the washing liquid to the wiper. The washing liquid outlets 14 are configured to be connected to a fluid channel 7a of a respective accessory 6 (FIG. 7).

The wiper also comprises an electrical connector 24 arranged near the washing liquid connector 12. The electrical connector 24 connects both ends of the heating wire 15 passing through the heating channels 16a, 16b of both accessories 6.

Therefore, the washing liquid flowing through the fluid channel 7a, 7b which might be frozen under negative outside temperature conditions, can be heated by the heating wire 15. It is thus possible to restore or maintain the spraying function and the flexibility of the wiper that could have been restrained by the frozen liquid.

The wiper also may further comprise a cover 22.

As it can be better seen on FIGS. 8 and 9, the cover 22 has for example a L-shape extending longitudinally. This cover 22 can be mounted in the washing liquid connector 12. The cover 22 maintains the heating wire 15 against the washing liquid connector 12 so that it can; also be heated by the same heating wire 15.

According to another embodiment represented on FIGS. 10 and 11, the washing liquid connector 12 comprises a longitudinal guide, arranged above the washing liquid inlet 13 and outlet 14. This longitudinal guide may be made of a longitudinal groove 23 receiving the heating wire 15. The heating wire 15 is thus pinched by the washing liquid connector 12 which allows guiding the two ends of the heating wire 15 so that they can be kept in the right position to be plug to the wiper arm.

According to another embodiment represented on FIGS. 12 to 14, the accessory 26 comprises two fluid channels 7a, 7b arranged on each side of the spline 3, and two heating channels 16a, 16b.

The heating wire 15 passes successively through the first and second heating channels 16a, 16b, making a U-turn at one end of the accessory 26, outside the accessory 26 (FIGS. 13 and 14).

Each heating channel 16a, 16b is arranged close to a respective fluid channel 7a, 7b. Therefore, the washing liquid flowing through the fluid channel 7a, 7b which might be frozen under negative outside temperature conditions, can be heated by a respective heating wire 15.

As previously, both heating channels 16a, 16b are for example mainly arranged in the second part 28 which comprises the fixation means to the longitudinal substrate 1 of the wiper. For example, the opening of the first part 27 gives access to both heating channels 16a, 16b.

As the heating channels 16a, 16b are arranged laterally on each side of the accessory 26 the snap means of the locking means may comprise a plurality of locking channels 20 and a plurality of respective complementary locking ribs 21.

For example, three locking channels 20 are arranged in the second part 28 and three complementary locking ribs 21 are arranged in the first part 27.

According to another embodiment represented on FIGS. 15 and 16, the accessory 36 is made of a first part 37 and a second part 38 which are distinct. The first part 37 is movable with respect to the second part 38 in order to open both heating channel 16a, 16b longitudinally. However, in this embodiment, first and second parts 37, 38 are fully separated when the heating channels 16a, 16b are open.

As previously, both heating channels 16a, 16b are for example mainly arranged in the second part 38 which comprises the fixation means to the longitudinal substrate 1 of the wiper. For example, the opening of the first part 37 gives access simultaneously to both heating channels 16a, 16b.

As the heating channels 16a, 16b are arranged laterally on each side of the accessory 36, the snap means of the locking means may comprise a plurality of locking channels 20 and a plurality of respective complementary locking ribs 21. Although FIGS. 12 to 16 illustrate a bi-channel version of the wiper with the accessory 27, 37 having two fluid channels 7a, 7b, an accessory could be provided with a plurality of locking channels and complementary locking ribs for a single heating channel version or for a version wherein the accessory comprises no fluid channel. In the same manner, an accessory with two distinct first and second parts could be provided for a single heating channel version or for a version with no'fluid channel.

The invention claimed is:

1. A wiper of a motor vehicle, comprising:
a longitudinal substrate;

a spline received in said longitudinal substrate;
a wiping blade fixed to said longitudinal substrate;
at least one aerodynamic deflector comprising:
  a plurality of heating channels for receiving a heating element of the wiper,
  wherein said aerodynamic deflector is made of a first part movable with respect to a second part in order to open the plurality of heating channels longitudinally;
the heating element received in the plurality of heating channels of the at least one aerodynamic deflector; and
a locking means to lock the first part closed with the second part, comprising:
  a snap means comprising at least one locking channel and a respective complementary locking rib, the at least one locking channel being arranged in the second part having a means to fix the aerodynamic deflector to the longitudinal substrate of the wiper, and the respective complementary locking rib being arranged in the first part.

2. The wiper according to claim 1, wherein said heating element is a heating wire.

3. The wiper according to claim 1, wherein said first part and said second part are made in one piece of deformable material.

4. The wiper according to claim 1, wherein said first part and said second part are two distinct parts.

5. The wiper according to claim 1, wherein the plurality of heating channels is mainly arranged in the second part having a means to fix the aerodynamic deflector to the longitudinal substrate of the wiper.

6. The wiper according to claim 1, wherein said locking means, and said first and second parts are formed in one piece.

7. The wiper according to claim 1, wherein said snap means comprises a plurality of locking channels and a plurality of respective complementary locking ribs.

8. The wiper according to claim 1, wherein said locking channel communicates with the plurality of heating channels.

9. The wiper according to claim 1, wherein the locking channel and the respective complementary locking rib have cylindrical complementary shapes.

10. The wiper according to claim 1, wherein the locking channel and the respective complementary locking rib have prismatic complementary shapes.

11. The wiper according to claim 1, wherein the opening of the first part gives access to the plurality of heating channels.

12. The wiper according to claim 1, further comprising at least one fluid channel provided with holes enabling the spraying of a washing liquid.

13. The wiper according to claim 1, wherein the at least one aerodynamic deflector comprises at least one fluid channel arranged along the longitudinal substrate provided with holes enabling the spraying of the washing liquid.

14. The wiper according to claim 13, further comprising an electrical connector and two aerodynamic deflectors, the heating element passing through the plurality of heating channels of both aerodynamic deflectors, and the electrical connector connecting both ends of the heating element.

15. The wiper according to claim 13, further comprising:
  a washing liquid connector and two aerodynamic deflectors having fluid channels connected by said washing liquid connector; and
  a cover.

16. The wiper according to claim 13, further comprising a washing liquid connector and two aerodynamic deflectors having fluid channels connected by said washing liquid connector, said washing liquid connector comprises a longitudinal guide to receive the heating element.

17. The wiper according to claim 13, wherein the heating element passes through the plurality of heating channels, making a U-turn at one end of the aerodynamic deflector.

18. The wiper according to claim 1, wherein the plurality of heating channels receives only one heating element of the wiper.

* * * * *